Dec. 22, 1964  W. M. DOWNS  3,162,782
OFFSET AXIS BRUSH HOLDER SPLIT HOUSING MOTOR
Filed April 21, 1961  3 Sheets-Sheet 1
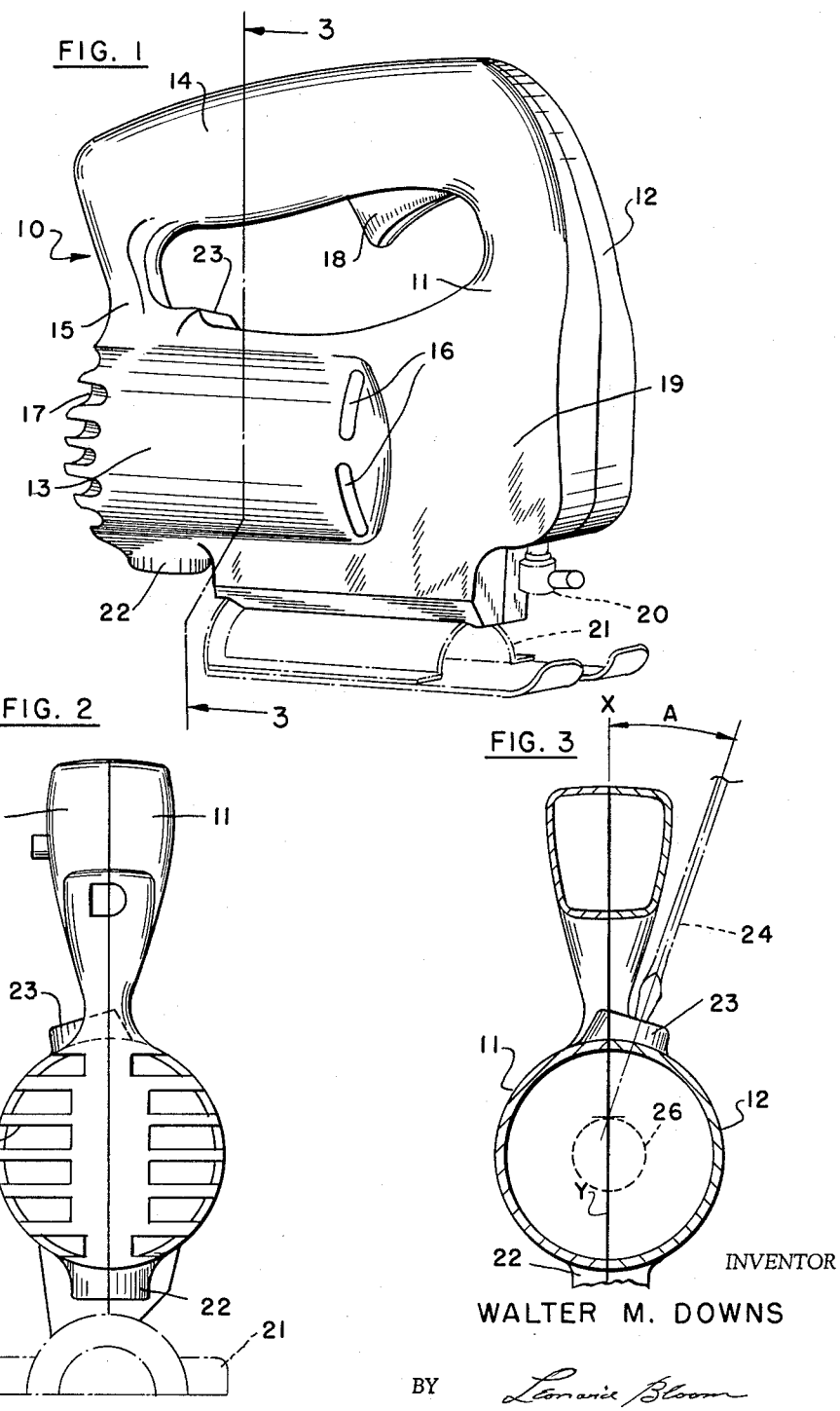
INVENTOR
WALTER M. DOWNS
BY
ATTORNEY Dec. 22, 1964     W. M. DOWNS     3,162,782
OFFSET AXIS BRUSH HOLDER SPLIT HOUSING MOTOR
Filed April 21, 1961     3 Sheets-Sheet 2
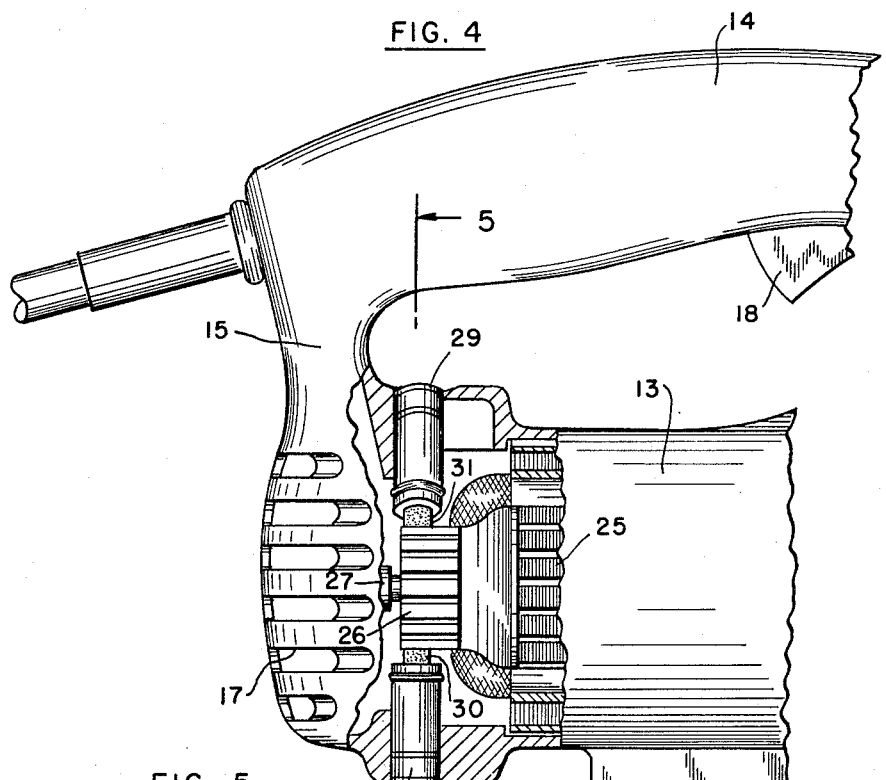
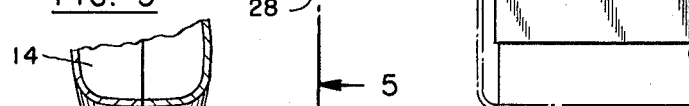
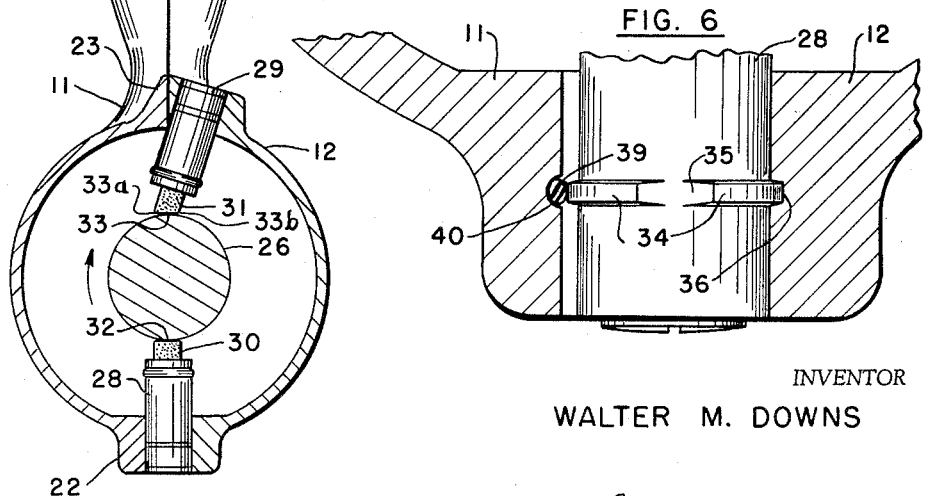
INVENTOR
WALTER M. DOWNS
BY
*Leonard Bloom*
ATTORNEY Dec. 22, 1964  W. M. DOWNS  3,162,782
OFFSET AXIS BRUSH HOLDER SPLIT HOUSING MOTOR
Filed April 21, 1961  3 Sheets-Sheet 3

INVENTOR
WALTER M. DOWNS
BY
ATTORNEY

United States Patent Office 3,162,782
Patented Dec. 22, 1964

3,162,782
OFFSET AXIS BRUSH HOLDER SPLIT
HOUSING MOTOR
Walter M. Downs, Towson, Md., assignor to The Black and Decker Manufacturing Company, Towson, Md., a corporation of Maryland
Filed Apr. 21, 1961, Ser. No. 104,759
7 Claims. (Cl. 310—50)

The present invention relates to an electrically-operated device, such as a portable electric tool, and more particularly, to such a device having an overhead-handle and further having an offset axis brush holder.

It is an object of the present invention to provide an overhead-handle portable electric jig saw, wherein the brush holder supports are located in the imaginary longitudinal midplane of the saw, and wherein the top holder support is inclined slightly with respect to the midplane.

It is another object of the present invention to provide an overhead-handle portable electric jig saw, wherein the top brush holder support is accessible, and wherein the overhead-handle does not interfere with the maintenance of the brush located in the top support.

It is yet another object of the present invention to provide, in an electrically-operated device having an overhead handle, a split housing having a pair of complementary mating halves joining in a common plane, in combination with a top brush holder support having an axis inclined slightly with respect to the common plane.

It is still another object of the present invention to provide, for use with a drum type of commutator, a pair of electrical brushes having axes inclined slightly with respect to each other, and further having parallel commutator-engaging faces which are diametrically opposite from one another.

It is yet still another object of the present invention to provide, in conjunction with a split-housing portable electric tool, a pair of brush holder supports, each of which is trapped between the complementary mating halves of the split-housing in the assembly of the tool.

These and other objects of the present invention will become apparent from a reading of the following specification, taken in conjunction with the enclosed drawings, in which:

FIGURE 1 is a perspective view of an overhead-handle portable electric jig saw having a split housing including a pair of complementary mating halves;

FIGURE 2 is a rear elevational view of the saw, showing the slight offset of the upper brush holder support;

FIGURE 3 is a view taken along the lines 3—3 of FIGURE 1;

FIGURE 4 is an enlarged fragmentary view of the rear of the saw, partly in section and partly in elevation;

FIGURE 5 is a view taken along the lines 5—5 of FIGURE 4;

FIGURE 6 is an enlarged portion of FIGURE 5, showing a portion of the lower brush holder support, trapped between the mating halves of the split housing;

Figure 7:
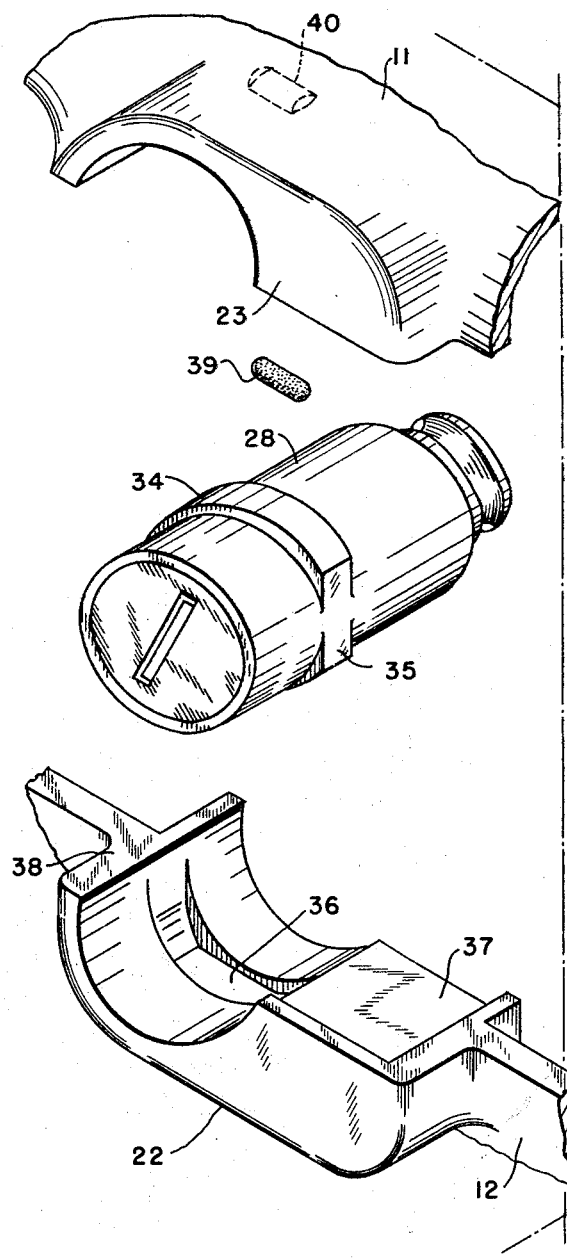
FIGURE 7 is a fragmentary exploded view of the brush holder support of FIGURE 6, showing its assembly in the saw.

In accordance with the teachings of the present invention, there is provided a portable electric jig saw having a split housing which includes a pair of complementary mating halves joining in a common plane. One of the mating halves is deemed the major half, and the other the minor half. The housing includes a motor housing and further includes an overhead handle extending longitudinally of the motor housing and approximately parallel thereto. A motor is in the motor housing, and the motor has a commutator in the rear portion of the motor housing. A pair of brush holder supports, comprising a lower support and an upper support, are mounted in the motor housing. The lower support has an axis lying in the common plane of the complementary mating halves; and the top support has an axis which is inclined slightly with respect to the common plane, the latter axis being inclined towards the major mating half. Electrical brushes are disposed within each of the supports, and the brushes have parallel commutator-engaging faces which are diametrically opposite from each other.

With specific reference to FIGURE 1, there is illustrated a portable electric jig saw 10 having a split housing comprising a pair of complementary mating halves 11 and 12; the halves 11 and 12 join in a common plane (or imaginary midplane) which extends longitudinally of the saw 10. The housing for the saw 10 includes a cylindrical motor housing 13 and an overhead handle 14. The handle 14 extends longitudinally of the saw 10 and approximately parallel to the motor housing 13, the handle 14 being joined to the rear portion of the motor housing 13, as at 15. The motor housing 13 may be provided with ventilating slots fore and aft, as at 16 and 17, respectively; and the saw 10 may be provided with a switch 18, gear case 19, reciprocating shaft 20, and shoe 21 in a manner understood by one skilled in the art.

With reference to FIGURES 2 and 3, the mating halves 11 and 12 join in a common plane, designated as X–Y in FIGURE 3; and the motor housing 13 is provided with a pair of bosses 22 and 23. The lower boss 22 is formed along an axis which lies within plane X–Y, whereas the upper boss 23 is formed along an axis which is inclined slightly with respect to plane X–Y. As shown in FIGURE 3, the angle of inclination, denoted by A, is shown as a slight acute angle of approximately 15° although it will be understood by those skilled in the art that other values of the angle A (up to approximately 45°) are technically feasible and hence are equally applicable to the teachings of the present invention. Thus, when suitable brush holder supports are mounted in bosses 22 and 23, as hereinafter described, each of the brushes will be accessible externally of the saw 10 for ready maintenance and repair; and it will be appreciated that the overhead handle 14 will not interfere with the access to upper boss 22. Thus a tool, such as a screwdriver 24 shown in phantom in FIGURE 3, may be applied to the brush holder in upper boss 23 so as to conveniently remove the brush. Consequently, the brushes in saw 10 may be readily serviced without requiring a disassembly of the mating halves 11 and 12, and moreover, the brushes may be maintained substantially along the longitudinal midplane X–Y of the saw 10; otherwise, without the benefit of the present invention, the brushes would have to be disposed at right angles to the midplane, which would have three undesirable effects; first, it would interfere with the location of air slots 17; secondly, it would partially distort the smooth symmetry of the saw 10; and thirdly, it would increase the width of the saw 10.

With reference to FIGURES 4 and 5, a motor of the universal series type is housed in motor housing 13, and the motor has an armature 25, conventional drum-type commutator 26, and an end bearing partially shown as at 27. Conventional brush holder supports 28 and 29 are located in bosses 22 and 23 respectively; and the supports have conventional axially-slidable brushes 30 and 31, respectively. The brush holder supports 28 and 29 have respective axes (not designated for ease of illustration); and the axes are located in a common plane, which is the plane of the paper in FIGURE 5. This plane is transverse to the axis of the commutator 26, and it passes forwardly of the junction 15 between motor housing 13 and overhead handle 14.

Moreover, the upper brush holder support 29, and the axis thereof, is inclined slightly with respect to the common midplane X–Y of the mating halves 11 and 12, as noted previously; and hence, each of the brushes 30 and 31, that is, their respective axes, are inclined slightly with respect to each other. Also, the brushes 30 and 31 have commutator-engaging faces 32 and 33, respectively; these faces 32 and 33 are parallel to each other and are diametrically opposite from one another for electrical reasons understood by one skilled in the art. Thus, the face 33 for upper brush 31 is beveled or chamfered, see FIGURE 5, with respect to the axis of brush 31; and also, it will be appreciated that each of the faces 32 and 33 are transverse to midplane X–Y. As shown in FIGURE 5, the angle by which the face 33 of brush 31 is beveled or chamfered with respect to its axis is substantially equal to the angle by which the axis of brush 31 is inclined away from the longitudinal midplane.

Furthermore, the mating half 12 is designated as the "major" half, while the mating half 11 is designated as the "minor" half; and in the assembly of the saw 10, all of the components, such as the motor, gearing, reciprocating shaft, etc., are placed in the major mating half 12 and are assembled together. Then, when all of the components have been assembled, the minor mating half 11 serves merely as a cover and is secured to the major mating half 12 by a number of screws, thus effecting a considerable savings in assembly time. For purposes of this invention, the use of a "major" half and a "minor" half of a split-housing device, per se, may be considered as conventional and hence within the knowledge of one skilled in the art.

As shown in FIGURES 6 and 7, each of the brush holder supports 28 and 29 is trapped (in the same manner) between the halves 11 and 12 in the assembly of the saw 10. For example, the lower brush holder support 28 has an annular ridge 34 having a pair of diametrically-opposed flats 35, each of which is coterminous or blends with the adjacent surface of the support 28; and the portions of lower boss 22 (in the mating halves 11 and 12) have arcuate recesses 36, one of which is shown in FIGURE 7. Brush holder support 28 is fitted into the major half 12 such that the arcuate portion of annular ridge 34 (between flats 35) seats within recess 36; and the flats 35 rest against the edges of ledges 37 and 38, thus retaining the support 28 axially thereof. A cylindrical plug 39 (of rubber or suitable material) is fitted within a semi-cylindrical transverse niche 40 (in minor half 11) and may be cemented in place. Then, when the halves 11 and 12 are secured together, the plug 39 takes up the clearance or tolerance between the suport and the halves 11 and 12. Hence, as shown in FIGURE 6, each of the supports, say support 28, rests snug against the major half 12; and there will be corresponding loose fit between the support 28 and the other (or minor) half 11, the clearance being taken up by the plug 39.

Figure 8:
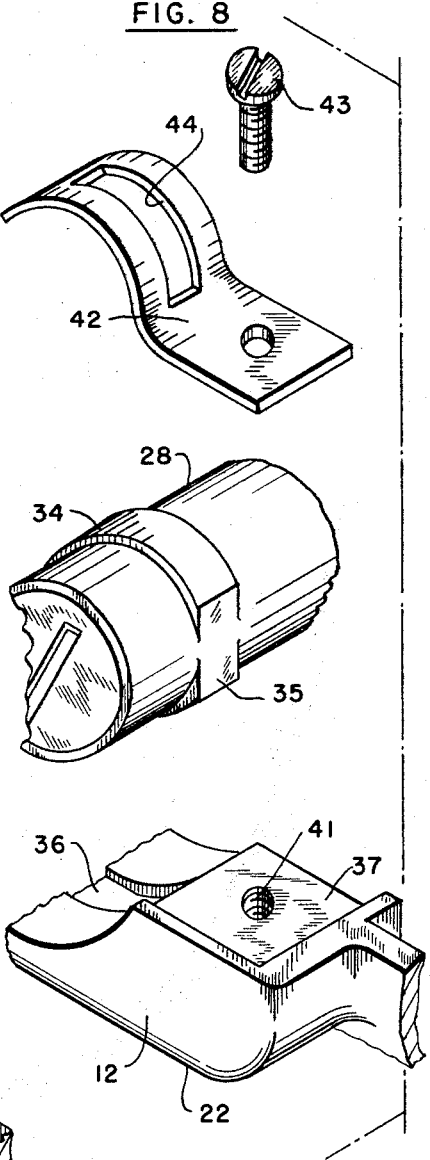
FIGURE 8 is a modification of the apparatus shown in FIGURE 7.

As shown in FIGURE 8, a modification consists in forming a tapped hole 41 in ledge 37 of the lower or major half 12 and retaining the brush holder support 28 by means of a cantilevered metal strap 42 and screw 43, the strap having a slot 44 for accommodating a portion of ridge 34. Thus, the support 28 is at all times retained in major half 12, even when the cover portion (that is, minor half 11) is removed; and in such case, the plug 39 is not necessary.

Not only are the respective axes of brushes 32 and 33 (and the supports therefor) inclined with respect to each other, as previously noted; but moreover, as best shown in FIGURE 3, the axis for the inclined brush, that is, for the upper support 29, does not intersect the center line (or longitudinal axis) for the drum-type of commutator 26, the latter being shown in dotted form in FIGURE 3.

Also, as best shown in FIGURE 6, the annular ridge 34 of each of the brush holder supports is provided with a slight taper so as to be complementary to reverse tapers in arcuate recesses 36. These recesses 36 are so tapered to facilitate removal of the die-cast shells or mating halves 11 and 12 from the molds therefor, in a manner understood by one skilled in the art of aluminum die-casting.

Also, as viewed in FIGURE 5, the commutator 26 rotates clockwise, that is, into the "toe" portion 33a of face 33 of brush 31 and away from the "heel" portion 33b thereof. This achieves superior results, and actual tests have shown that upper brush 31 has approximately 30% more life than lower brush 30; yet both of the brush holder supports 28 and 29 are located in major half 12 for ease of assembly, and each of the brushes 30 and 31, respectively, are readily accessible for ease of maintenance and repair without requiring a disassembly of the tool 10 and without otherwise interfering with the streamlined symmetry of the tool.

I claim:

1. In a portable electrically-operated device, the combination which comprises a motor having a commutator, a motor housing including a pair of complementary mating halves having interior surfaces joining in a common plane, an overhead handle extending approximately parallel to said motor housing and above said commutator, a pair of brush holder supports in said motor housing comprising a lower support having an axis lying in the common plane of said mating halves and a top support having an axis inclined by an angle not exceeding 45° with respect to the common plane, and brushes within each of said supports, each of said brushes having an interior commutator-engaging face with said faces being diametrically opposite from each other and parallel to each other.

2. The combination according to claim 1, wherein said complementary mating halves comprise a major half and a minor half, and wherein said axis of said top brush holder support is inclined towards said major half.

3. In a portable electric tool, the combination which comprises a split housing including a pair of complementary mating halves having interior surfaces joining in a common plane, one of said mating halves being the major half and the other the minor half, said split housing having a cylindrical motor housing and further having an ovrehead handle extending approximately parallel to said motor housing, said motor housing and said overhead handle being joined together in a junction at the rear of said motor housing, a motor in said motor housing, said motor having a commutator in the rear of said motor housing a pair of brush holder supports in said motor housing comprising a lower support having an axis lying in the common plane of said complementary mating halves and a top support having an axis inclined by an angle not exceeding 45° with respect to the common plane, said axis of said top support being inclined towards said major half, each of said support axes lying in a plane passing transversely to said cylindrical motor housing and passing forwardly of said junction of said overhead handle and the rear of said motor housing, and electrical brushes within each of said supports, each of said brushes having an interior commutator-engaging face with said faces being diametrically opposite from each other and parallel to each other.

4. In a portable electrically-operated device, the combination which comprises a motor having a commutator, a motor housing having an imaginary longitudinal midplane, an overhead handle extending above said commutator, a lower brush holder boss having an axis lying within said midplane of said motor housing, and a top brush holder boss having an axis inclined by an angle not exceeding 45° with respect to said midplane, each of said bosses confining commutator-engaging brushes.

5. In a portable electrically-operated device, the combination which comprises a motor having a commutator, a motor housing having an imaginary longitudinal midplane, an overhead handle extending above said commutator, a lower electrical brush supported in said motor housing, said lower brush having an interior commutator-engaging face which is transverse to said midplane, and a top electrical brush supported in said motor housing and having a longitudinal axis which is inclined by an angle not exceeding 45° with respect to said midplane, said top brush having an interior commutator-engaging face which is transverse to said midplane and which is diametrically opposite from and parallel to said face of said lower brush.

6. In an electrically-operated device, the combination of a split housing comprising a major half and a minor half secured together along a common longitudinal midplane, an electric motor in the housing having a commutator, the axis of which is substantially within the midplane, a pair of brushes comprising a top brush and a bottom brush having respective commutator-engaging faces which are diametrically opposed to each other, means to slidably support said bottom brush between the mating halves of the split housing for movement along an axis which is substantially within the midplane, and means to slidably support said top brush in the major half of the split housing for movement along an axis which is inclined with respect to the midplane by an angle ranging from zero to forty-five degrees.

7. In an electrically-operated device, the combination of a housing having a longitudinal midplane, a motor in said housing, a commutator carried by said motor, the axis of which is substantially with the midplane, a pair of electrical brushes comprising a first brush and a second brush riding upon said commutator, means to support said first brush for sliding movement along an axis which is substantially within the midplane, said first brush having a respective commutator-engaging face formed substantially at right angles to its axis, means to support said second brush within said housing for sliding movement along an axis which is inclined by an angle with respect to the midplane, said second brush having a respective commutator-engaging face which is chamfered with respect to its axis by an angle which is substantially equal to the angle by which the axis of said second brush is inclined with respect to the midplane, with said respective faces of said brushes being substantially parallel to each other and opposed to each other across the diameter of said commutator.

References Cited in the file of this patent

UNITED STATES PATENTS

| | | |
|---|---|---|
| 476,426 | Sperry | June 7, 1892 |
| 2,636,136 | Gubbins | Apr. 21, 1953 |
| 2,693,541 | Pratt | Nov. 2, 1954 |
| 2,840,732 | Nottelman | June 24, 1958 |
| 2,984,758 | Hansen | May 16, 1961 |